United States Patent
Frolov et al.

(10) Patent No.: US 10,040,561 B2
(45) Date of Patent: Aug. 7, 2018

(54) AIRBORNE KINETIC ENERGY CONVERSION SYSTEM

(71) Applicant: SUNLIGHT PHOTONICS INC., South Plainfield, NJ (US)

(72) Inventors: Sergey V. Frolov, New Providence, NJ (US); Michael Cyrus, Summit, NJ (US); Allan J. Bruce, Scotch Plains, NJ (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 585 days.

(21) Appl. No.: 13/856,879

(22) Filed: Apr. 4, 2013

(65) Prior Publication Data
US 2015/0097071 A1   Apr. 9, 2015

(51) Int. Cl.
   *B64D 27/24*   (2006.01)
   *B64C 39/02*   (2006.01)
   *B64D 41/00*   (2006.01)
   *G05D 1/00*    (2006.01)

(52) U.S. Cl.
   CPC ............ *B64D 27/24* (2013.01); *B64C 39/024* (2013.01); *B64D 41/007* (2013.01); *G05D 1/0005* (2013.01); *B64C 2201/042* (2013.01); *B64C 2201/066* (2013.01); *B64C 2201/141* (2013.01); *Y02T 50/53* (2013.01); *Y02T 50/64* (2013.01)

(58) Field of Classification Search
   USPC ........................................ 244/13, 16, 14, 58
   See application file for complete search history.

(56) References Cited

U.S. PATENT DOCUMENTS

| | | | | | |
|---|---|---|---|---|---|
| 1,495,036 | A | * | 5/1924 | David | 244/58 |
| 3,907,221 | A | * | 9/1975 | Goodrich | 244/58 |
| 4,251,040 | A | * | 2/1981 | Loyd | 244/154 |
| 4,324,985 | A | * | 4/1982 | Oman | 290/55 |
| 4,428,711 | A | * | 1/1984 | Archer | 415/2.1 |
| 4,490,093 | A | * | 12/1984 | Chertok et al. | 416/26 |
| 5,150,859 | A | * | 9/1992 | Ransick | 244/58 |
| 5,685,694 | A | * | 11/1997 | Jones et al. | 416/147 |
| 5,899,411 | A | * | 5/1999 | Latos et al. | 244/53 A |
| 6,045,089 | A | * | 4/2000 | Chen | 244/12.1 |
| 6,581,873 | B2 | * | 6/2003 | McDermott | 244/25 |

(Continued)

FOREIGN PATENT DOCUMENTS

| | | |
|---|---|---|
| DE | 19828720 A1 | 12/1999 |
| DE | 10156868 A1 | 5/2003 |
| EP | 2629166 A1 | 8/2013 |

OTHER PUBLICATIONS

U.S. Appl. No. 13/460,146, dated Apr. 30, 2012, Frolov et al.
(Continued)

*Primary Examiner* — Brian M O'Hara
*Assistant Examiner* — Keith L Dixon
(74) *Attorney, Agent, or Firm* — Moser Taboada; Alan Taboada

(57) ABSTRACT

Methods and apparatus to harvest renewable energy are provided herein. In some embodiments, a wind-powered aircraft includes an airframe suitable for untethered flight in an open airspace; and an airborne kinetic energy conversion system attached to the airframe, the airborne kinetic energy conversion system comprising a turbine, a generator connected to the turbine, and an electrical storage means connected to the generator.

16 Claims, 9 Drawing Sheets

(56) References Cited

U.S. PATENT DOCUMENTS

| | | | |
|---|---|---|---|
| 6,742,741 B1 * | 6/2004 | Rivoli | 244/12.1 |
| 7,198,225 B2 * | 4/2007 | Lisoski et al. | 244/55 |
| 7,270,214 B1 * | 9/2007 | Tonnessen et al. | 181/110 |
| 7,431,243 B1 | 10/2008 | Allen | |
| 7,762,495 B2 * | 7/2010 | Miller | 244/13 |
| 8,002,216 B2 * | 8/2011 | Decker | 244/58 |
| 8,439,301 B1 * | 5/2013 | Lussier et al. | 244/63 |
| 8,448,898 B1 * | 5/2013 | Frolov et al. | 244/59 |
| 2003/0141409 A1 * | 7/2003 | Lisoski et al. | 244/13 |
| 2007/0252035 A1 | 11/2007 | Hubbard, Jr. | |
| 2009/0238741 A1 | 9/2009 | Konigorski | |
| 2010/0140390 A1 | 6/2010 | Goodall | |
| 2011/0121570 A1 | 5/2011 | Bevirt et al. | |
| 2012/0209456 A1 | 8/2012 | Harmon et al. | |

OTHER PUBLICATIONS

U.S. Appl. No. 13/856,892, Filed Apr. 4, 2013, Frolov et al.
International Search Report and Written Opinion dated July 25, 2014 for PCT Application No. PCT/US2014/032507.

* cited by examiner

AIRBORNE KINETIC ENERGY CONVERSION SYSTEM

FIELD

The present invention relates to improved energy harvesting and its use on aircraft. In particular, the invention relates to an aircraft employing a hybrid power system for harvesting various renewable energy sources, such as sunlight and wind.

BACKGROUND

Unmanned Aerial Vehicles (UAVs) are unpiloted aircraft that are either controlled remotely or are flown autonomously. UAVs are commonly categorized based on their design and performance spanning the range from small low altitude to large high altitude long endurance vehicles. The UAV technology is taking an increasingly important place in our society for commercial, civilian and military applications. UAVs could provide improved service over existing systems in a large number of applications, ranging from border patrol and coastal surveillance, monitoring of natural disasters, meteorology and cartography to highly flexible telecommunication relay stations. The required endurance may be in the range of a few hours, for example in the case of law enforcement, border surveillance, forest fire fighting or power line inspection. Other applications at high altitudes, such as, for example, communication platform for mobile devices, weather research and forecast, environmental monitoring, may require remaining airborne for days, weeks, months or even years. It is possible to reach these goals using renewable energy sources.

One of the readily available renewable energy sources is sunlight. The use of sunlight as a source of energy for aircraft has many compelling advantages. Sunlight provides about 1000 $W/m^2$ at sea level, but reaches more abundant 1400 $W/m^2$ at high altitudes also unobstructed by cloud cover. Photovoltaic (PV) cells and modules may be used to collect the solar energy during the day, a part of which may be used directly for maintaining flight and onboard operations with the remainder being stored for the night time.

So far the solar energy has been the only renewable energy source seriously considered for use onboard UAVs. However, the atmospheric environment provides other potentially plentiful and useful sources of energy, for example wind. Unlike solar power, wind power may be available 24 hours a day. Hybrid power systems based on solar and wind power could provide UAVs with more reliable and effective renewable power sources. With advances in efficient and smart power systems, aircraft powered by renewable energy sources may achieve sustained flight at high altitudes for days, weeks and even years.

SUMMARY

Methods and apparatus to harvest renewable energy are provided herein. In some embodiments, a wind-powered aircraft includes an airframe suitable for untethered flight in an open airspace; and an airborne kinetic energy conversion system attached to the airframe, the airborne kinetic energy conversion system comprising a turbine, a generator connected to the turbine, and an electrical storage means connected to the generator.

In some embodiments, a wind-powered aircraft includes an airframe suitable for untethered flight in an open airspace; and an airborne kinetic energy conversion system attached to the airframe, the airborne kinetic energy conversion system comprising a turbine, a mechanical converter connected to the turbine, and mechanical energy storage means connected to the converter.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
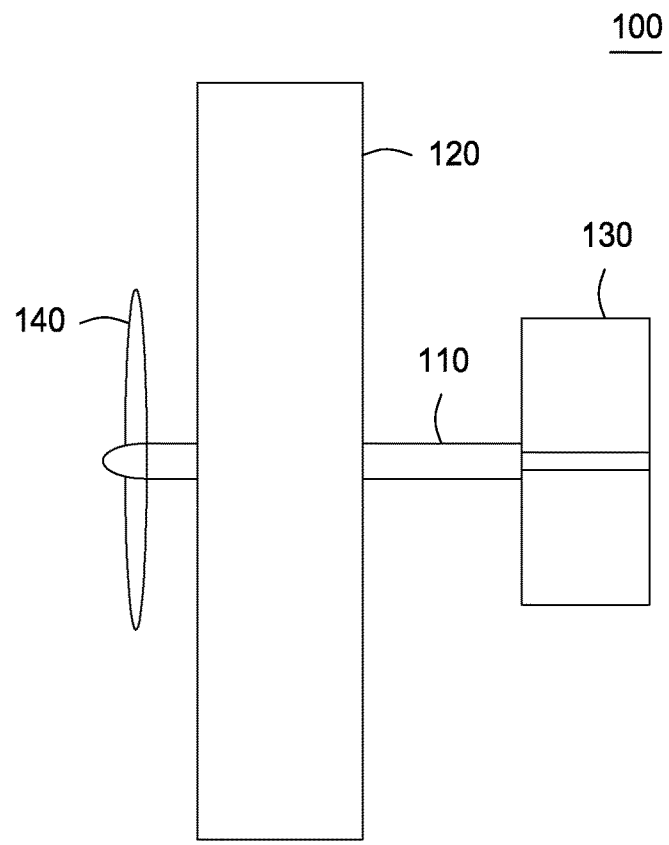
FIG. 1 schematically depicts the main parts of a typical aircraft.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

FIG. 1 shows schematically the main parts of a typical aircraft 100, which include a fuselage 110, a main wing 120, a tail section 130 and a propulsion system including propeller 140. In general, there may be other critical parts and components not shown or hidden from view in FIG. 1. Conversely, in some aircraft certain parts may be missing. For example, all-wing airplanes (i.e., flying wings) may not have separate fuselage and tail. Furthermore, piloted aircraft may also have a cockpit for a pilot. On the other hand, UAVs may have specialized electronics and payloads that enable autonomous flight and operation. This aircraft may be outfitted with means to harvest renewable energy from such sources as sunlight and wind, as described in more detail below. Prior aircraft have been shown to use only sunlight energy as a persistent renewable energy source. In general, various types of engines and motors may be used for propulsion. However, for UAVs and especially long endurance UAVs, it is sometimes beneficial to use electric motors, since they can be powered electrically using renewable energy sources.

Figure 2:
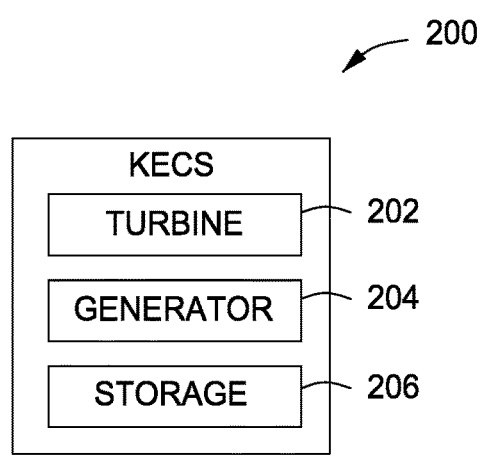
FIG. 2 schematically depicts a kinetic energy conversion system (KECS) in accordance with embodiments of the present invention.

In accordance with embodiments of this invention, methods and apparatus are provided for kinetic energy conversion onboard aircraft in free flight. Kinetic energy conversion facilitates extraction of renewable energy from wind as a sole source of energy or an additional source in a hybrid power system. Aircraft able to harness the wind power thus could have access to alternative power sources, such as atmospheric turbulence, wind shears, updrafts, thermals, and others. FIG. 2 shows schematically a kinetic energy conversion system (KECS) 200 comprising a turbine 202, a generator (or other type of energy converter 204) and means for energy storage 206. Means for energy storage 206 may include an electric battery, a capacitor, a flow battery, a regenerative fuel cell, and other types of electrical storage. In this case mechanical energy provided by the turbine 202 is transformed by the generator 204 into electricity and stored for later use. Alternatively instead of the generator 204, a mechanical adapter or converter, e.g. a gearbox, may be used with the turbine, from which the mechanical energy may be transferred and stored directly using mechanical storage means, such as flying wheel storage.

Figure 3:
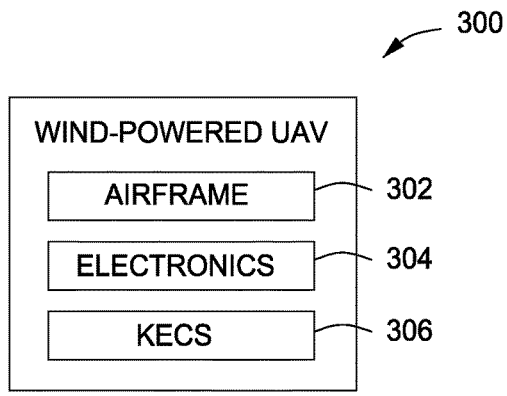
FIG. 3 schematically depicts some elements of a wind-powered UAV.
Figure 4:
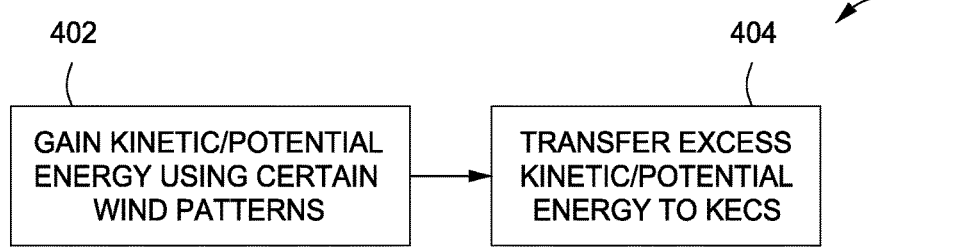
FIG. 4 depicts a process for harvesting wind energy in accordance with embodiments of the present invention.

In accordance with embodiments of this invention, a wind-powered aircraft may be produced using a KECS. FIG. 3 shows schematically at 300 the main elements of a wind-powered UAV, which comprises an airframe 302, electronics 304, and a KECS 306. Also there may be other elements in a UAV that are not shown in FIG. 3, such as for example a propulsion system. Unlike ground-based and tethered airborne wind turbines, an airborne turbine on untethered aircraft in free flight cannot convert wind energy into electricity directly. Instead, such an aircraft could be wind-powered by harvesting wind energy using a two-step process shown as 400 in FIG. 4. In this method, an aircraft first gains excess mechanical energy at 402, i.e., either the kinetic energy by increasing speed or the potential energy by ascending to a higher altitude. This excess energy may be subsequently transferred to the KECS at 404, e.g., by flying faster to drive the KECS' turbine, and then stored onboard in either mechanical or electrical form. The excess potential energy can be defined as the difference between the current potential energy and the potential energy at a cruising altitude. Similarly, the excess kinetic energy can be defined as the difference between the current kinetic energy and the kinetic energy at a cruise speed.

Figure 5:
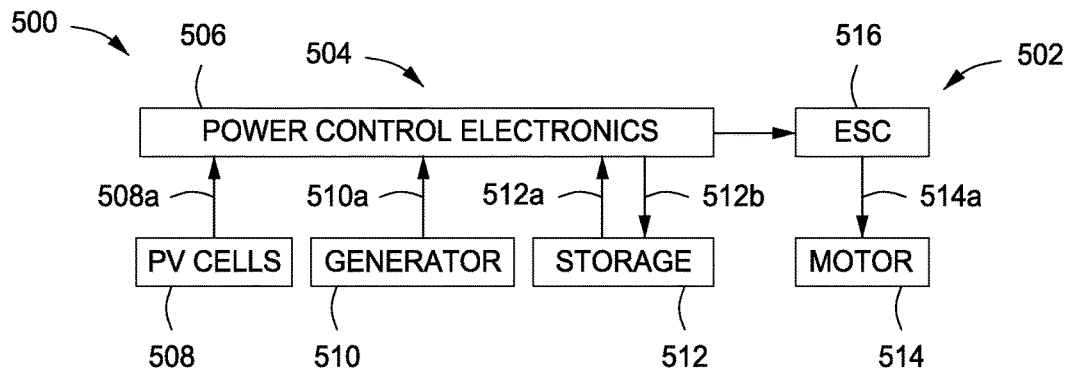
FIG. 5 schematically depicts a hybrid system in accordance with embodiments of the present invention.

In general, a KECS may be a stand-alone system or an integrated system. In some embodiments, the KECS is seamlessly integrated with other components onboard an aircraft (e.g., the KECS can be a distributed system having one or several shared elements). FIG. 5 shows schematically a hybrid system 500 comprising an integrated KECS 502 and a solar power system 504 integrated with propulsion and power train systems. The hybrid system includes a power control electronics block 506, which monitors and controls the electrical power flow among other elements, such as photovoltaic (PV) cells 508, a generator 510, and an electrical storage (e.g., a battery 512), as shown by arrows 508a, 510a, 512a, and 512b, respectively. The hybrid system 500 includes an electric motor 514 controlled via an electronic speed controller (ESC) 516. The power to the motor 514 is provided from a number of other elements in the hybrid system, including as non-limiting examples, a solar power system 504 comprising PV cells 508, a generator 510 (as a part of the KECS), and an electrical storage (e.g., a battery 512). PV cells 508 provide electrical power when sunlight is available, while the KECS generator 510 provides electrical power when appropriate wind resources are available. The power generated by the PV cells 508 and the generator 510 can be used for powering electronics 504 and the motor 514, as well as for recharging the battery 512. The battery 512 in turn may be used as a power source in the absence of the other two power sources (e.g., PV cells 508 and the generator 510), or when their combined power is insufficient. The power control electronics block 504 may comprise different parts for interfacing with other elements in the hybrid system, such as a charger for the battery, a maximum power point tracker for the solar system, a speed controller for the generator and so on.

Figure 6:
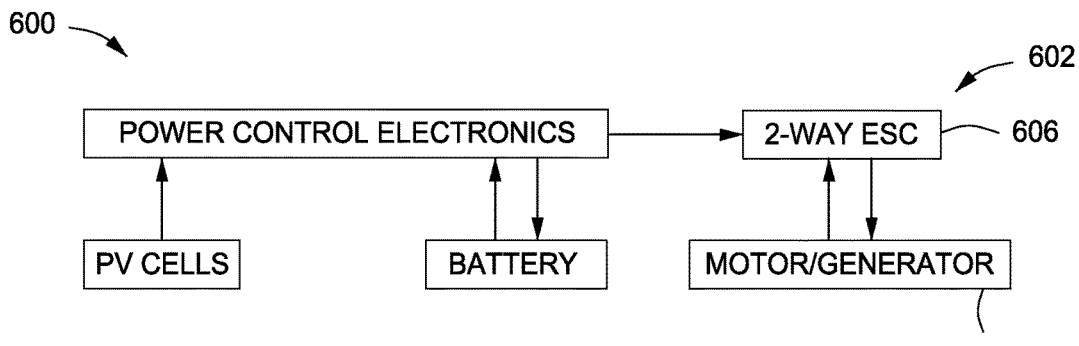
FIG. 6 schematically depicts a hybrid system in accordance with embodiments of the present invention.

FIG. 6 shows schematically another hybrid system 600 comprising a KECS 602 integrated with propulsion and power train systems. In this system, the generator and the motor are combined into a single unit 604. The electric motor here may be run also as a generator, where instead of consuming it may produce electrical power. Similarly, a propeller (not shown) in this case may be also used as a turbine. In some embodiments, this capability is provided by a specialized electronic component, such as a two-way electronic speed controller (ESC) 606. The direction of the power flow between the motor/generator 604 and the ESC 606 depends on the direction or the sign of the torque exerted by air onto the propeller. For simplicity, the motor/generator unit 604 will be referred to as the motor in the following.

Figure 7:
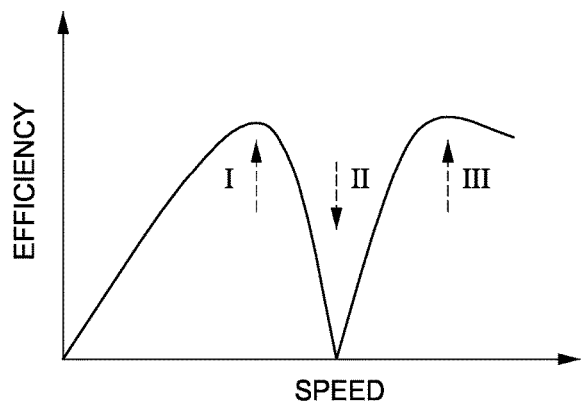
FIG. 7 is an illustrative plot of propeller efficiency vs. aircraft speed.

In general, a propeller can be characterized by a number of different parameters, including its pitch speed $V_p$—the speed at which the torque is equal to zero. Thus, the motor in an aircraft moving at speeds lower than $V_p$ may consume power and provide thrust to the airframe. Conversely, the motor in an aircraft moving at speeds higher than the pitch speed may generate power and exert aerodynamic drag. To illustrate this, FIG. 7 shows a plot of the propeller efficiency vs. the aircraft speed. Three different operating modes can be distinguished: propeller (I), freewheeling (II), and turbine (III), which respectively correspond to operating below, near and above $V_p$. Although, the exact shape of the efficiency curve shown in FIG. 7 may vary depending on the particular characteristics of any given propeller, its overall shape is typical. The best efficiency from a propeller in the propeller mode may be achieved operating at speeds of about 0.75 to about $0.95V_p$. Similarly, the best efficiency from a propeller in the turbine mode may be achieved operating at speeds of about 1.05 to about $1.25V_p$. Thus the transfer from one mode of operation to the other may be accomplished by either changing an aircraft speed or a pitch speed with respect to each other. For example, a propeller maintaining a cruise speed of $0.8V_p$ may be turned into a turbine by accelerating an aircraft to a speed of $1.2V_p$. The pitch speed is proportional to the propeller's rotation rate (RPM) and pitch. Therefore, the transfer between different operating modes may be also accomplished via changing $V_p$ without changing the aircraft speed. For example, the motor may either increase or decrease its RPM to respectively increase or decrease the pitch speed. Similarly, a variable pitch propeller may either increase or decrease its pitch to respectively increase or decrease the pitch speed.

Figure 8:
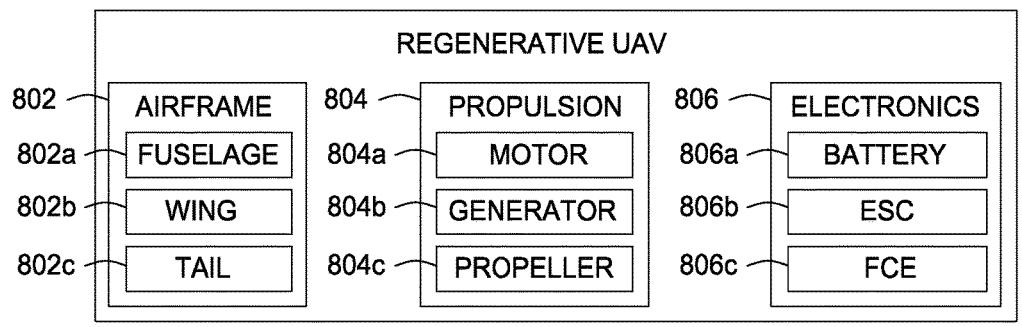
FIG. 8 depicts components of a regenerative UAV in accordance with embodiments of the present invention.

In accordance with embodiments of this invention, a regenerative UAV the energy used by the aircraft can be replenished or regenerated using renewable energy sources) may be produced comprising elements and components shown in FIG. 8. The UAV 800 may comprise an airframe 802, a propulsion system 804, and electronics 806, which in turn include at least a fuselage 802a, a wing 802b, a tail 802c, a motor 804a, a generator 804b, a propeller/turbine 804c, a battery 806a, an ESC 806b, and flight control electronics (FCE) 806c. Other elements may also be included, for example, such as solar cells as an alternative renewable power source. A feature of a regenerative UAV (e.g., 800) is its ability to recover, convert and store its kinetic and potential energy using the KECS. In embodiments consistent with FIG. 8, the KECS elements are integrated into different systems of the regenerative UAV: one KECS element, the generator 804b, is integrated with the propulsion system 804 and another KECS element, battery 806a is integrated with the electronics system 806. As described above, a motor can be operated as a generator, so that the motor and the generator onboard the regenerative UAV may be combined in a single unit. Similarly, a single propeller may be used as a regular propeller to provide the thrust and as a turbine to provide excess electrical power.

Figure 9:
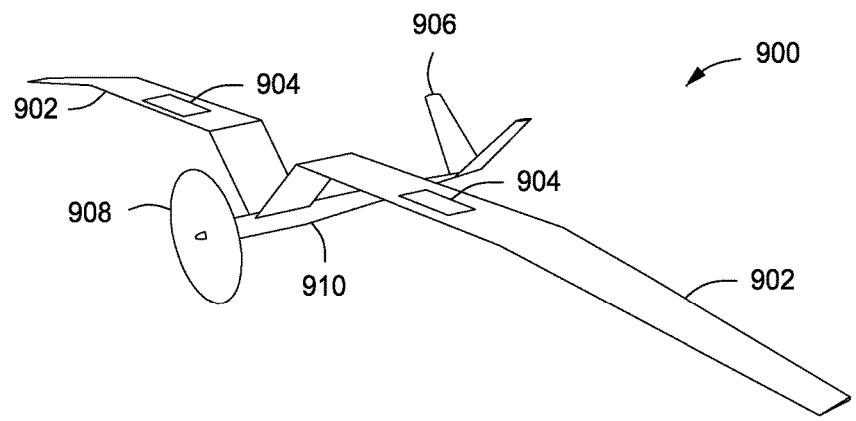
FIG. 9 depicts a regenerative UAV in accordance with embodiments of the present invention.

FIG. 9 shows one non-limiting example of a possible implementation of a regenerative UAV 900. This aircraft is optimized for long-term endurance and efficient use of all available renewable resources. Its wings 902 are lightweight (for example substantially less than 50% of the total weight) and may be produced from composite materials, for example those based on carbon fiber, fiber glass, Kevlar®, and others. The wings 902 may be covered with PV solar cells (shown schematically as 904) to efficiently collect and convert solar energy. The wings 902 have a downward bow shape in order to increase solar exposure at dawn and dusk. Examples of suitable downward bow shapes of the wings 902 may be found in U.S. patent application Ser. No. 13/460,146, filed Apr. 30, 2012 by Sergey V. Frolov, et al., and entitled "AUTONOMOUS SOLAR AIRCRAFT", which is incorporated herein by reference in its entirety. The wings are also shaped to increase soaring efficiency, i.e. the ability to capture and ride thermal and forced-air vertical flows. The shape of the wing 902 may also reduce aerodynamic interference between the main wing and the tail 906, as a well as interference from the propeller 908. The wings' airfoil profile may be optimized to produce high lift and low drag at low Reynolds numbers of less than 100,000, i.e. low air speeds. For example, a GM15 airfoil profile may be used.

A single propeller 908 is located in line with the streamlined fuselage 910, which also contains electronics and payloads (not shown). As result, the center of gravity may be lowered significantly below the wings to improve flight stability. Various tail configurations are possible, such as cross-tails, V-tails (shown as 906), T-tails, and others. V-tail configuration may be an aerodynamically efficient tail configurations in some embodiments. The UAV configuration described above is particularly suitable for relatively low-weight aircraft with the total weight of less than about 50 kg. Of course, many other UAV designs incorporating a KECS are possible. For example, in the case of larger and heavier aircraft, an airframe with multiple motors and propellers may be preferred, where at least one and preferably all of the available motors are also configured to operate as generators.

A regenerative UAV may have either a fixed or variable airframe. In the latter case, at least some of the airframe elements may alter their relative position in order to change the aerodynamic characteristics of the UAV. For example, a wing may alter its position to either increase or decrease the wing span. Alternatively, it may change its shape, e.g. by bending or unbending of a bowed wing, to shift the relative position of the center of gravity. These changes may favorably affect the operational effectiveness of the hybrid power system. For example, solar-powered flight may favor an airframe configuration with a lower cruising speed, higher stability and higher endurance. On the other hand, a wind-powered flight may favor an airframe configuration with a higher cruising speed and higher maneuverability.

Figure 10:
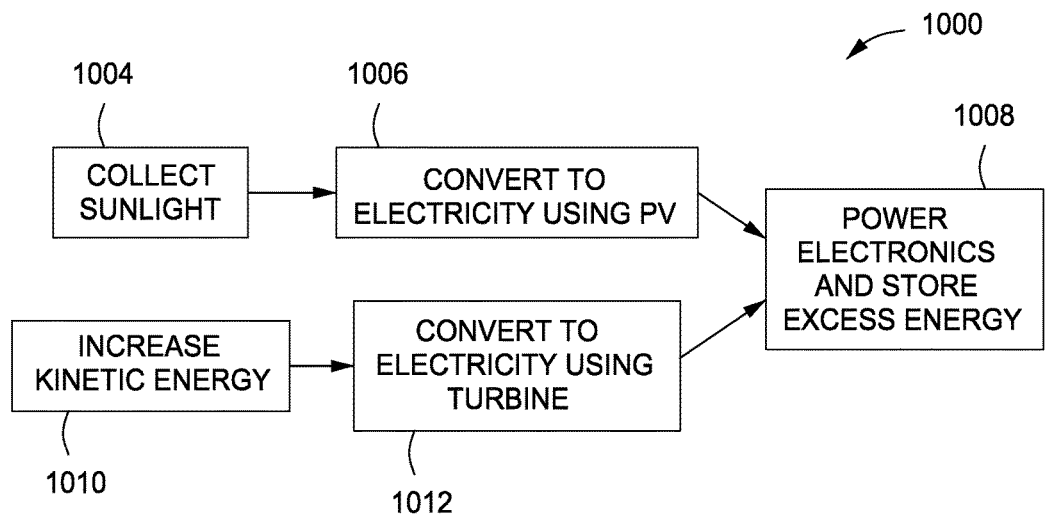
FIG. 10 depicts a method of powering a regenerative UAV in accordance with embodiments of the present invention.
Figure 11:
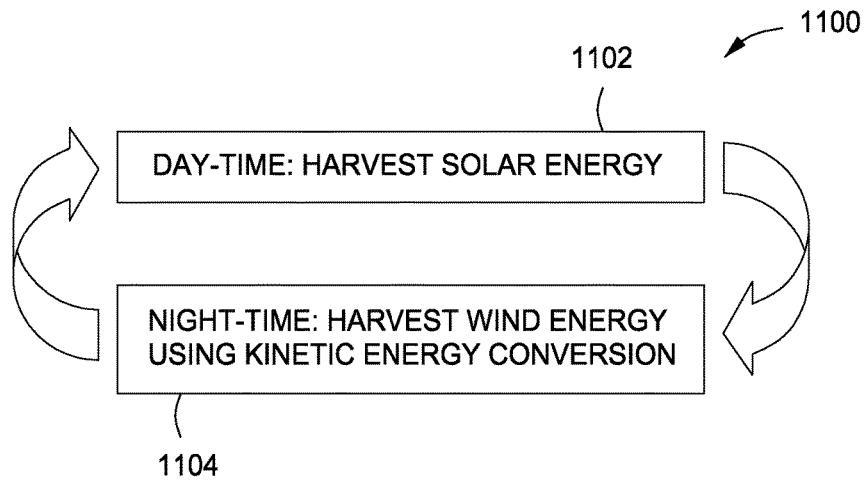
FIG. 11 depicts a method of powering a regenerative UAV in accordance with embodiments of the present invention.

A regenerative UAV equipped with solar cells and a KECS can be powered using both types of renewable energies simultaneously as shown in FIG. 10. In this method shown as 1000, the solar PV cells collect sunlight at 1004 and convert solar energy to electricity at 1006. At the same time, the UAV may increase its kinetic energy at 1010 and convert it to electricity using the KECS' turbine at 1012. Both types of renewable energy channels can be used simultaneously to power electronics, the excess energy being stored for later use at 1008. In another non-limiting configuration 1100 shown in FIG. 11 the two different types of renewable energies are used at different times. The PV solar cells and modules may be used at daytime to harvest solar energy for immediate use and storage at 1102, while the KECS may harvest wind energy at night time at 1104. This configuration may reduce the required storage capacity for the battery and thus lower UAV's total weight.

Figure 12:
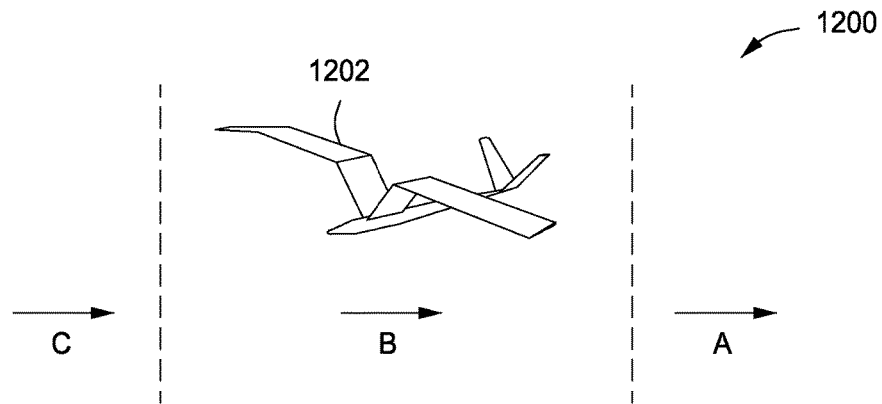
FIG. 12 schematically depicts use of a type of wind resource suitable for powering UAVs in accordance with embodiments of the present invention.

Unlike a solar PV system that can operate only at daytime, a KECS can operate whenever appropriate wind resource is available whether it is night or daytime. A number of different types of wind resources can be identified as suitable for powering UAVs. FIG. 12 shows a UAV 1202 flying along a straight horizontal line through airspace regions marked as A, B and C from right to left. Region B is characterized by having a higher wind speed against the UAV flight direction with respect to regions A and B, i.e. a wind gust. A wind gust in this case increases the relative airspeed and provides excess kinetic energy that may be used by the KECS for conversion to electrical power. Similarly, when flying with the wind (i.e. a tail wind), a drop in wind speed could also provide excess kinetic energy. In general, any air turbulence that causes an increase in the UAV airspeed may be used by the KECS as a renewable wind resource. In some cases, multiple KECS may be used on a single aircraft for better utilization of air turbulence. For example, an aircraft may have two independent KECS installed on opposite sides of a wing, so that each KECS may operate and react differently to local air turbulence events, even when the events on different sides of the wing differ from each other.

Figure 13:
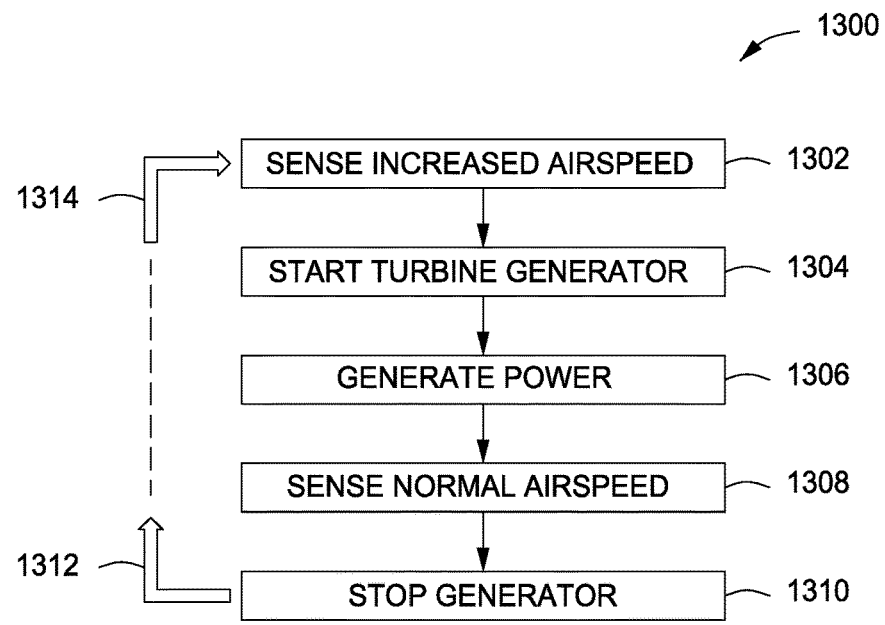
FIG. 13 depicts a method of using various wind conditions as renewable wind energy resources in accordance with embodiments of the present invention.

The above method of using wind gusts and turbulence as renewable wind energy resource may be generalized as 1300 as shown in FIG. 13. The method 1300 comprises the following steps: (1) sensing increased airspeed at 1302, (2) starting a generator connected to a turbine (alternatively, operating a motor in a generator mode) at 1304 in response to higher airspeed, (3) generating electrical power at 1306, (4) sensing when airspeed returns to normal at 1308, and (5) stopping the generator or exiting the generator mode at 1310. This sequence of steps may be repeated indefinitely as indicated by arrows 1312, 1314.

Figure 14:
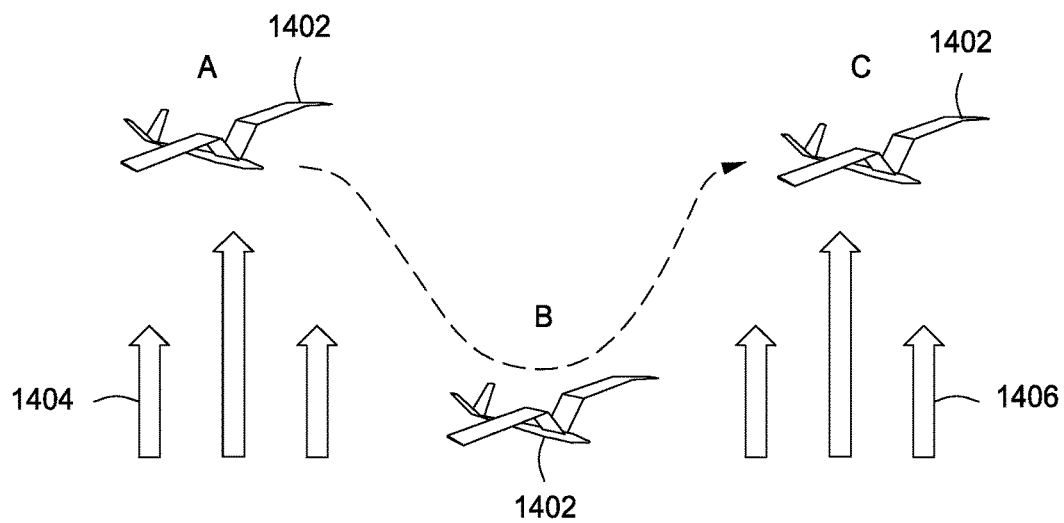
FIG. 14 schematically depicts use of a type of wind resource suitable for powering UAVs in accordance with embodiments of the present invention.

An updraft or an upward vertical air movement represents another appropriate wind resource. There are various examples of such updrafts in Earth atmosphere. For example, a thermal is a column of rising air created by heating of the ground or sea by the sun. FIG. 14 shows a UAV 1402 flight path across airspace regions marked as A, B and C from left to right. Regions A and C with upward air streams 1404 and 1406 respectively may be categorized as thermals. The UAV 1402 flying through these regions may soar without using its propulsion system, gain excess altitude and obtain excess potential energy. This energy may be released and converted to electricity via an onboard KECS by going through region B without vertical airflows, where the UAV may descend and attain a higher speed necessary for power generation. This procedure may be repeated as needed, e.g. the UAV 1402 may go in and out of the same thermal and repeatedly use its KECS for power production even in the absence of other energy sources. In the case of large updraft columns and relatively smaller scale UAVs, it may be possible to operate KECS more efficiently even without leaving the updraft region, e.g. operating the KECS while circling inside a thermal column and maintaining constant altitude.

Figure 15:
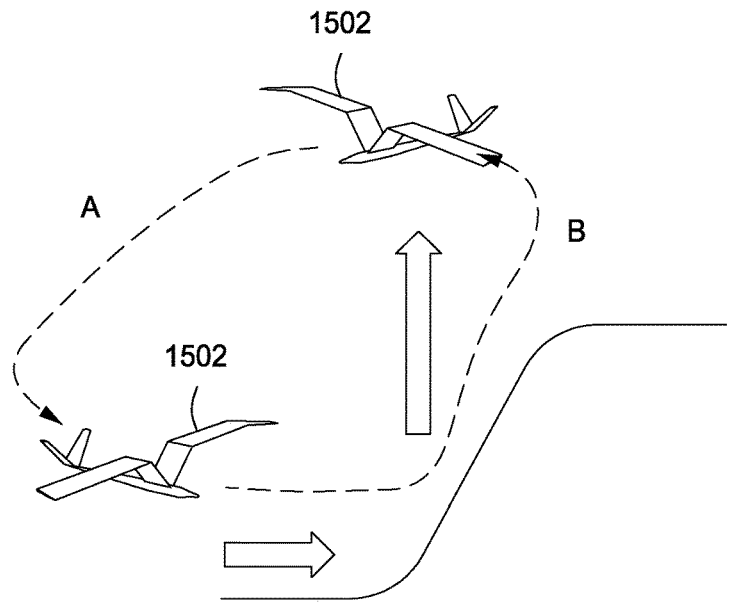
FIG. 15 schematically depicts use of a type of wind resource suitable for powering UAVs in accordance with embodiments of the present invention.

In addition to thermals, other types of upward air streams suitable for soaring may be available, e.g. an updraft produced by winds blowing over mountain tops or into hilltops and steep ridges. FIG. 15 shows a UAV 1502 flying near a mountain ridge through airspace regions labeled A and B. Region B has an updraft that can used for soaring, where the UAV 1502 may gain excess potential energy. This excess energy may then be converted by the KECS into electricity by flying through region A. This procedure may be repeated as needed.

Figure 16:
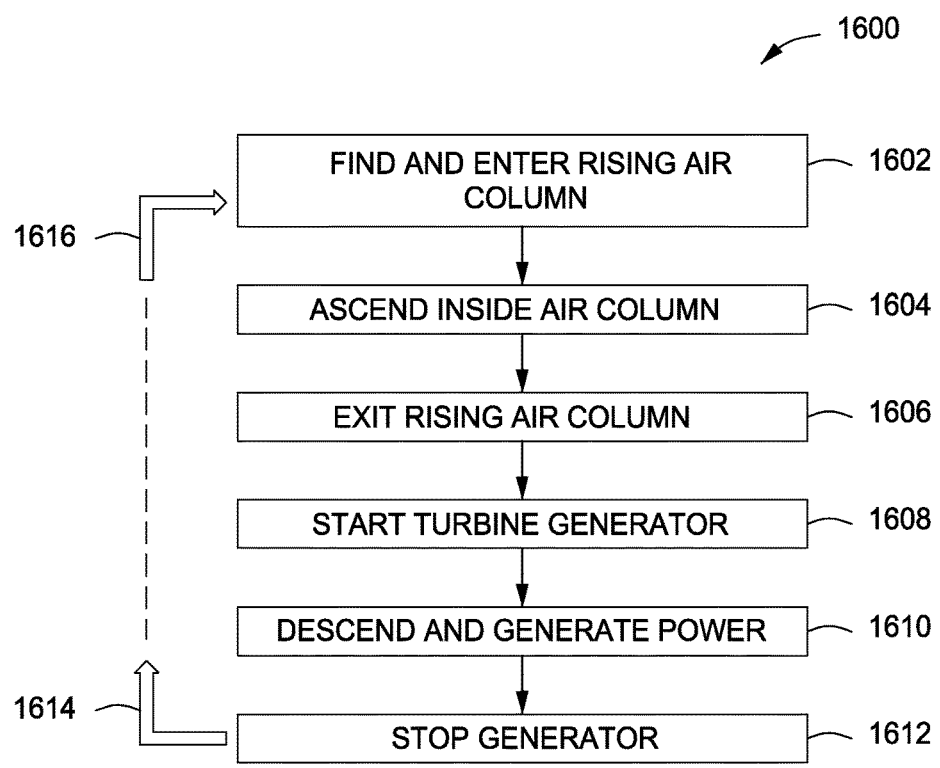
FIG. 16 depicts a method of using a wind resource of FIG. 14 or FIG. 15 as an energy source in accordance with embodiments of the present invention.

In accordance with embodiments of this invention, the method of using a KECS in an updraft can be generalized as shown in FIG. 16. The method 1600 may comprise the following steps: (1) finding and entering a rising air column 1602, (2) ascent and gain in altitude 1604, (3) exiting the column 1606, (4) starting the generator mode in the KECS 1608, (5) descent with power generation 1610 and (6) shutting off the generator 1612. The method is cyclical and may be repeated indefinitely as indicated by arrows 1614 and 1616.

Figure 17:
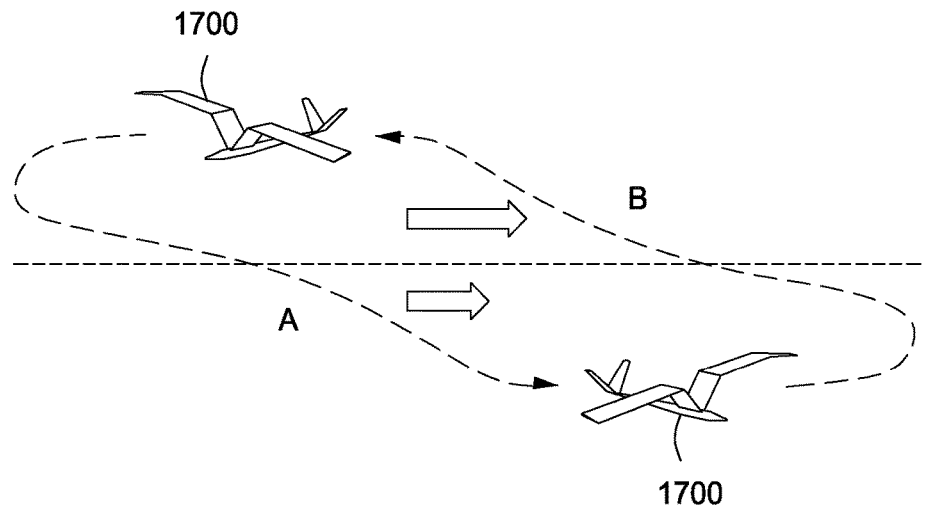
FIG. 17 schematically depicts use of a type of wind resource suitable for powering UAVs in accordance with embodiments of the present invention.
Figure 18:
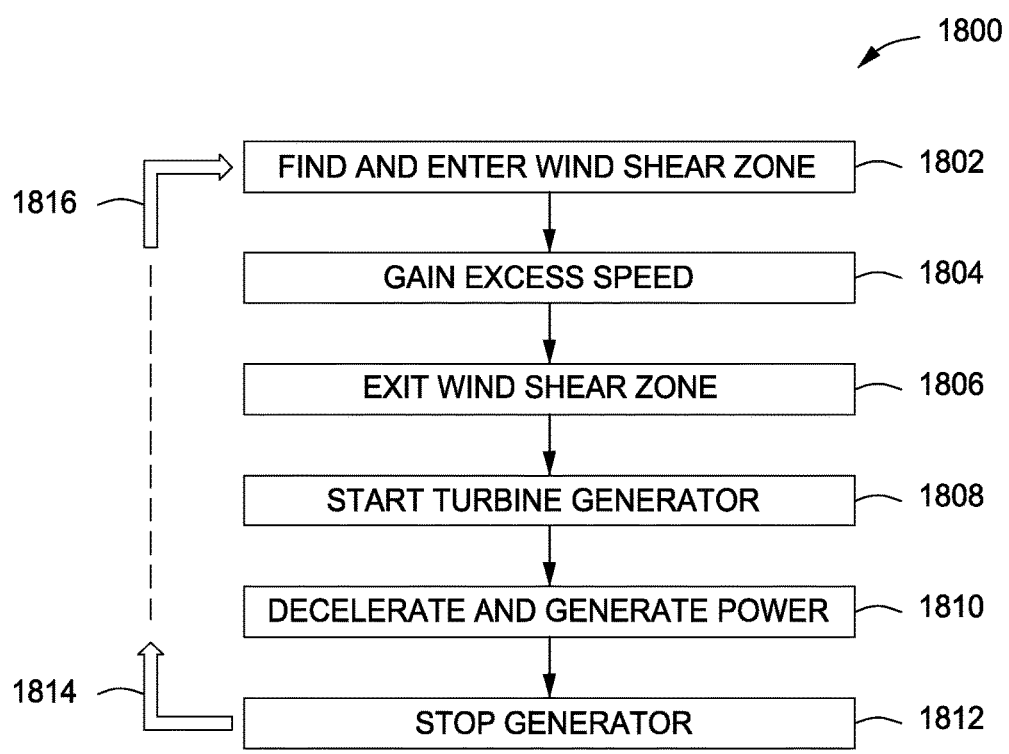
FIG. 18 depicts a method of using the wind resource of FIG. 17 as an energy source in accordance with embodiments of the present invention.

Another type of available wind resource includes a wind shear, an atmospheric condition in which two air streams (usually horizontal streams) occur side by side or in near proximity to each other. FIG. 17 shows a UAV 1700 flying through an airspace region with a wind shear comprising two zones: A and B, where the wind speeds are relatively smaller and larger with respect to each other. Using a maneuver called dynamic soaring and depicted in FIG. 17 by a dotted line, the UAV 1700 can gain air speed far in excess of its cruising speed and the wind speed in regions A and B. The resulting excess kinetic energy may be used by the KECS for electrical conversion either inside or outside the wind shear region. For example, FIG. 18 shows one possible method of using the wind shear as a renewable energy source. The method 1800 may comprise the following steps: (1) finding and entering a wind shear zone 1802, (2) gaining excess speed 1804, (3) exiting the wind shear zone 1806, (4) starting the generator mode in the KECS 1808, (5) decelerating and generating power 1810 and (6) shutting off the generator 1812. The method is cyclical as other KECS methods and may be repeated indefinitely as indicated by arrows 1814 and 1816.

Figure 19:
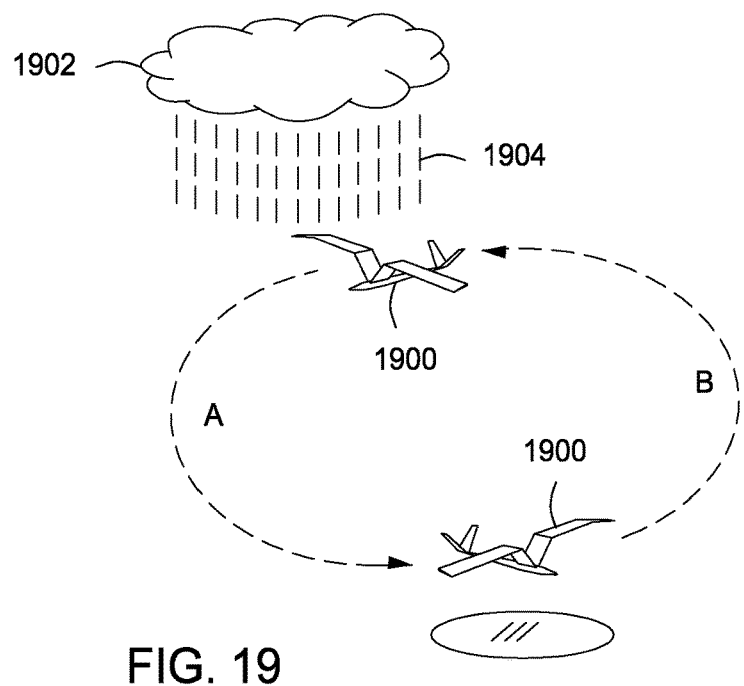
FIG. 19 schematically depicts use of an energy resource suitable for powering UAVs in accordance with embodiments of the present invention.
Figure 20:
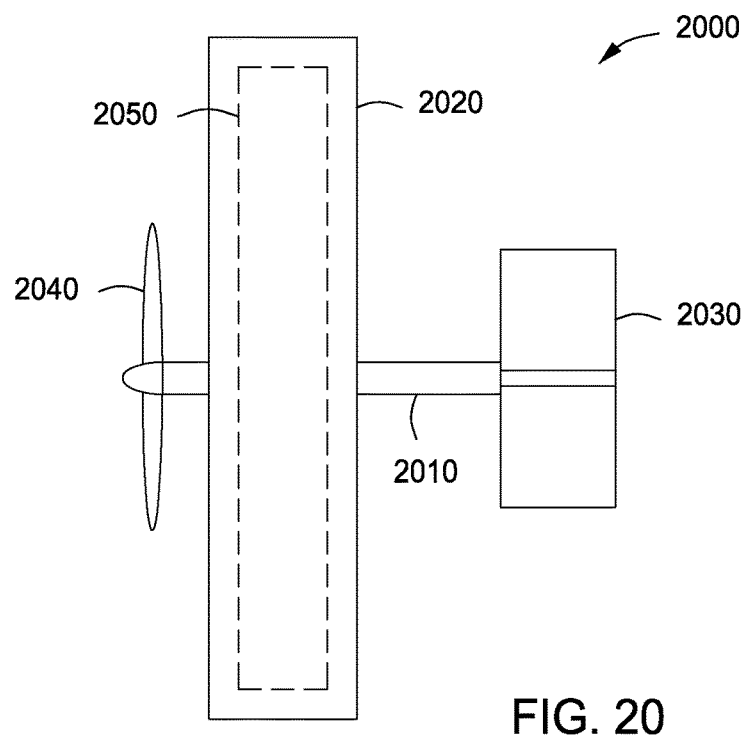
FIG. 20 depicts an exemplary UAV in accordance with embodiments of the present invention and suitable for use in connection with the energy resource of FIG. 19.
Figure 21:
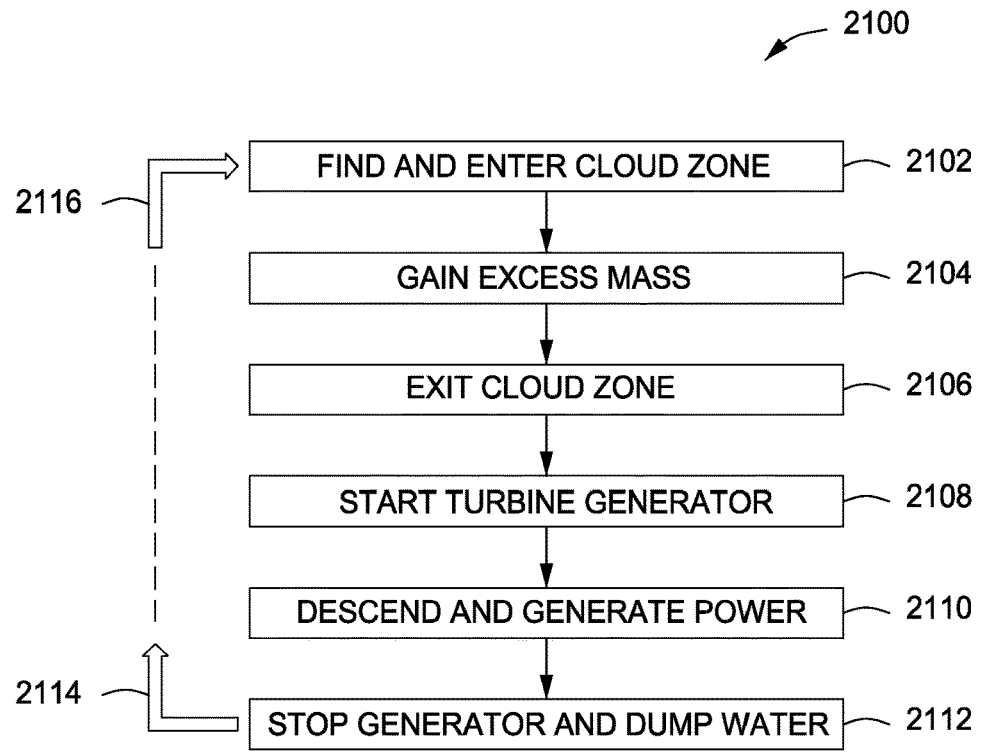
FIG. 21 depicts a method that may be used for power generation from the energy resource of FIG. 19 in accordance with embodiments of the present invention.

Wind and other air movements are not the only potential energy resources in the atmosphere that can be exploited by a KECS. FIG. 19 illustrates how a UAV 1900 may gain excess potential energy by flying through a cloud 1902 and collecting airborne moisture 1904 as excess weight. Moisture 1904 present in region A in the form of fog, rain, ice, or snow may be collected to temporarily increase the total weight of the UAV. The excess weight provides excess energy for power conversion by the KECS during descent, after which excess water maybe discarded and the UAV may return to the original position in region B outside the cloud zone. In this case, the UAV may be equipped with a specialized container for onboard water collection and storage. FIG. 20 shows an exemplary UAV 2000 comprising a fuselage 2010, a main wing 2020, a tail section 2030, a propulsion system including propeller 2040 and a water or moisture collector 2050. The water collector 2050, e.g. a water-tight plastic container, may be located inside the wing, the fuselage, or inside special cavities outside the airframe. The following method shown in FIG. 21 may be used for power generation. The method 2100 may comprise the steps of: (1) finding and entering a cloud zone 2102, (2) collecting moisture and gaining excess mass and weight 2104, (3) exiting the cloud zone 2106, (4) starting the generator in the KECS 2108, (5) descending and generating power 2110 and (6) shutting off the generator and disposing of excess water 2112. The sequence may be followed by ascend and repeat of the above sequence as indicated by arrows 2114 and 2116.

Figure 22:
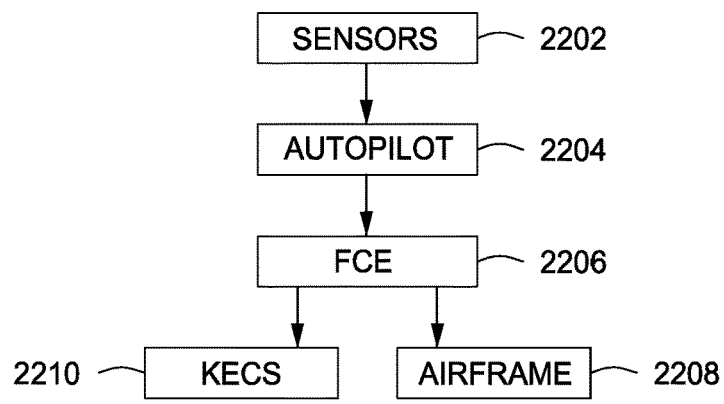
FIG. 22 depicts the flow of data provided for flight control electronics in a UAV in accordance with embodiments of the present invention.

The above methods and flight maneuvers may be executed by either an autopilot in a pilotless mode or a pilot (remote or onboard). A pilotless mode may be attractive for UAVs in some applications. In the case of a pilotless UAV, an aerial vehicle may be equipped with a range of different sensors 2202, such as pressure sensors, temperature sensors, airspeed sensors, moisture and humidity sensors, pitot tubes, altimeters, accelerometers, gyroscopes, position (GPS) sensors, light sensors, imaging sensors and others. Sensory data from the sensors 2202 may be continuously or intermittently provided to an autopilot system 2204 on board a UAV as shown in FIG. 22, which can process the data, plan the flight path, calculate the actual path, evaluate path corrections and provide necessary data for flight control electronics (FCE) 2206. The FCE 2206 in turn continuously operates on the airframe control surfaces 2208 to maintain the set flight path and at the same time manages the operation of the KECS 2210. The autopilot system 2204 may be able to automatically analyze the sensory data and recognize the presence of various atmospheric resources suitable for powering the KECS 2210, including vertical updrafts and horizontal wind shears. When a particular resource is detected, the autopilot 2204 may engage an appropriate computer program with a flight algorithm corresponding to such a resource. The autopilot hardware may be preloaded with software containing various programs corresponding to different potential resources. In the absence of any resource, the autopilot 2204 may initiate an active search algorithm, in which an aircraft may fly a random flight path and look for tell-tale signs of potentially useful atmospheric resources.

While the foregoing is directed to embodiments of the present invention, other and further embodiments of the invention may be devised without departing from the basic scope thereof.

The invention claimed is:

1. A wind-powered aircraft, comprising:
   an airframe suitable for untethered flight in an open airspace;
   an airborne kinetic energy conversion system attached to the airframe, the airborne kinetic energy conversion system comprising a turbine, a generator connected to the turbine, and an energy storage means configured to be charged by the generator;
   a propulsion system including an electric motor and a propeller powered at least in part by the airborne kinetic energy conversion system, wherein the electric motor and propeller provide thrust to the aircraft during untethered flight;
   flight sensors; and
   flight control electronics suitable for controlling a flight path of the aircraft, wherein the flight control electronics comprises an electronic autopilot system programmed to perform a flight maneuver for harvesting wind power in presence of one or more of a vertical updraft, horizontal wind shear, a wind gust, or a cloud zone.

2. The aircraft of claim 1, wherein the wind-powered aircraft is an unmanned aircraft.

3. The aircraft of claim 1, wherein the autopilot system is configured to receive and analyze data from the flight sensors to recognize the presence of one or more of the vertical updraft, the horizontal wind shear, the wind gust, or the cloud zone.

4. The aircraft of claim 3, wherein the autopilot system is configured to search for one or more of the vertical updraft or the horizontal wind shear.

5. The aircraft of claim 1, further comprising a photovoltaic solar power system.

6. The aircraft of claim 5, further comprising power control electronics configured to control power flow among the energy storage means, the generator, and the photovoltaic solar power system.

7. The aircraft of claim 1, wherein the electric motor and the propeller function as the generator and the turbine.

8. The aircraft of claim 7, further comprising a two-way speed controller.

9. The aircraft of claim 7, wherein the propeller is a variable pitch propeller.

10. The aircraft of claim 1, further comprising a water collector.

11. The aircraft of claim 1, further comprising a plurality of generators.

12. The aircraft of claim 11, wherein the plurality of generators are configured to operate independently of each other.

13. The aircraft of claim 1, wherein the airframe comprises a lightweight wing made from a carbon fiber material.

14. The aircraft of claim 1, wherein the airframe comprises a wing having a downward bow shape.

15. The aircraft of claim 1, wherein the airframe comprises a wing having a capability to change one of its shape and relative position.

16. A wind-powered aircraft, comprising:
   an airframe suitable for untethered flight in an open airspace;
   an airborne kinetic energy conversion system attached to the airframe, the airborne kinetic energy conversion system comprising a turbine, a mechanical converter connected to the turbine, and mechanical energy storage means configured to be charged by the converter;
   a propulsion system including an electric motor and a propeller powered at least in part by the airborne kinetic energy conversion system, wherein the electric motor and propeller provide thrust to the aircraft during untethered flight;
   flight sensors; and
   flight control electronics suitable for controlling a flight path of the aircraft, wherein the flight control electronics comprises an electronic autopilot system programmed to perform a flight maneuver for harvesting wind power in presence of one or more of a vertical updraft, horizontal wind shear, a wind gust, or a cloud zone.

* * * * *